Patented Jan. 28, 1936

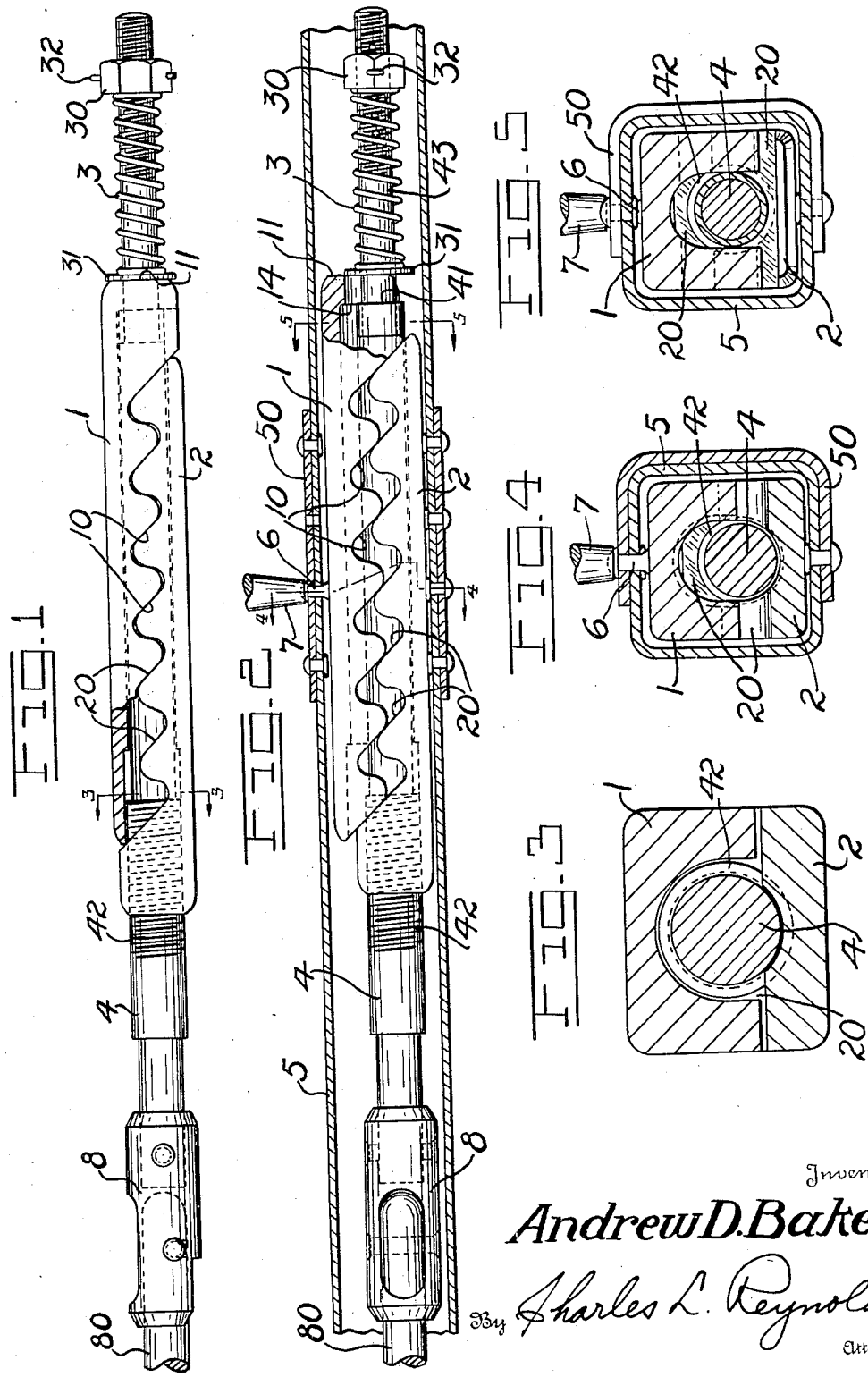

2,028,890

UNITED STATES PATENT OFFICE 2,028,890

RIVETING MOUSE

Andrew D. Baker, Seattle, Wash., assignor to Boeing Airplane Company, Seattle, Wash., a corporation of Washington Application December 2, 1933, Serial No. 700,679

8 Claims. (Cl. 78—46)

My invention relates to devices for upsetting rivets on the inside of tubes, and is particularly valuable in aeronautical construction.

Such a device is termed a riveting mouse, and previous devices for the same purpose, formed of two members urged apart by a spring, have proven defective in that the riveting blows, forcing the two members together, have been concentrated at one spot or in a localized area, causing the metal of which the members are formed to crystallize and break after short periods of use. It is a major object of my present invention, therefore, to devise a mouse for such uses, which will distribute the force of the riveting blows at several points of contact between the two relatively movable members of the mouse, thereby to lessen the force at any one point, and to distribute it over such a number of surfaces as will lessen the destructive effect and tendency to breakage, whereby the mouse will have a very much greater life in service.

It is also an object to devise a mouse which may be quickly adapted for work in tubes of varying sizes, and, further, to devise a mouse which is readily adjustable for tension, and for small differences in the size of the tube.

It is a further object to simplify the construction of such a mouse, whereby it can be made at reduced cost.

My invention comprises the novel mouse as a whole, and the novel parts and manner of assemblage thereof into the complete combination, all as shown in the drawing accompanying this specification and in the claims at the end thereof.

In the accompanying drawing I have shown my invention embodied in a typical form of mouse.

Figure 1 is an elevation of the mouse, with the parts pressed together, a part being broken away and shown in section.

Figure 2 is a similar view of the mouse, shown within a tube, in condition for operation.

Figures 3, 4 and 5 are transverse sections on the respective lines 3—3 of Figure 1, and 4—4 and 5—5 of Figure 2.

The rivet-engaging member and the backing member of the mouse are formed as two complemental pieces 1 and 2, respectively, although it is immaterial which engages the rivet and which serves as the backing piece. These are elongated members, and each of them is formed with serrations constituting several parallel surfaces, as 10 and 20, complementally inclined and in engagement with like surfaces of the other member. These inclined surfaces are spaced longitudinally of the members 1 and 2, so that each surface 10 bears at the same time and substantially equally on the corresponding inclined surface 20. The two members are normally urged apart by a spring 3, and to accomplish this the spring may be formed as a coil spring surrounding a threaded extension 43 of a rod 4, one end of the spring bearing against a nut 30 adjustably secured on the threaded extension 43, and the other end bearing against a washer 31, which in turn bears against a shoulder 11 at the end of the member 1. Each of these members is formed with a longitudinally extending recess, and the two members straddle the central portion of the rod. A shoulder 41 on the rod engages a shoulder 14 on the member 1, whereby the spring, forcing these two shoulders into engagement, limits the outward movement of the member 1, yet because this member is merely bifurcated it is a simple matter to retract the spring and withdraw the member 1 to substitute therefor a like member which may be somewhat thicker or somewhat thinner than the original member 1, to the end that the mouse may be used for different sizes of tubes. The member 2, on the other hand, is secured to the rod 4, which may be threaded at 42 to receive the member 2, which is complementally threaded.

It is clear that the two parts of the mouse may be pressed together sufficiently to enter a tube such as 5 forming a structural member of an airplane wing, fuselage or the like, and then may be moved along through the inside of the tube to a point where one of the two relatively movable members, for instance the member 1 engages beneath the shank of a rivet 6 which is to be headed on the inside of the tube. The other member of the mouse, the backing member 2, at this time bears against the opposite wall of the tube 5, and when riveting blows are struck by a riveting hammer 7 the force is transmitted to the member 1, which in turn changes the direction of the force and transmits it through each of the inclined surfaces 10 and 20 to the member 2, and to the spring 3, which through the rod 4 is backed by the member 2. The heading of the rivet is accomplished by the resistance of the member 1, due to inertia, to the resistance of the spring 3, and to the reaction of the spring 3, throwing the member 1 back (again by reaction and change of direction because of the inclined surfaces) against the end of the rivet shank. In this manner a member such as the gusset 50 may be secured to the tube 5.

For minor adjustments in the size of the mouse the member 2 may be threaded in or out on the threads 42. For adjustments of the tension of the spring 3 the nut 30 may be threaded in or out on the extension 43, and may be held in any adjusted position by the cotter pin 32 or any like locking device.

The position of the mouse within the tube may be controlled, and it may be inserted and withdrawn by any suitable holding device, such as the chuck illustrated at 8, on the end of a shank 80 which extends beyond the end of the tube. The ends of the members 1 and 2 are rounded off, as may be seen in Figures 1 and 2, to the end that they will ride over rivets or other obstructions inside the pipe, and may be readily inserted and withdrawn.

By reason of the fact that the force applied to the member 1 is transmitted to the member 2 through not one or two but several surfaces distributed along the entire length of the relatively movable members 1 and 2, the force at any one point is not great, and the tendency to crystallization and breakage is materially reduced. While I have illustrated seven such surfaces, the term "several" indicates that there are at least more than two but not a great many, the number employed depending on the length of the members 1 and 2 and on the force of the riveting blows. Furthermore, if the force should be sufficiently great as to move the members 1 and 2 into contact, the serrations, whereon are formed the inclined surfaces 10 and 20, come into contact with each other and act as stops, all substantially at the same time, and this force is likewise distributed, preventing damage. The reverse curves connecting the inclined surfaces are of appreciable radius, and leave no well-defined line where crystallization may begin.

What I claim as my invention is:

1. A riveting mouse comprising a rod, a member secured on one end thereof and extending along the rod, and having two parallel inclined surfaces one at each end thereof and regularly spaced inclined surfaces disposed intermediately between and parallel to said end surfaces, a complemental member straddling the rod and having parallel inclined surfaces, one at each end thereof and intermediate surfaces, complemental to and engaged with those of said first member, a coil spring surrounding the rod for urging said complemental surfaces on the two members together to expand said members laterally, and stop means for limiting the relative expanding movement of said two members to keep the complemental surfaces in contact.

2. A riveting mouse comprising an elongated backing member and a similarly elongated rivet-engaging member, each having several parallel inclined surfaces extending transversely and spaced lengthwise for complemental interengagement between the surfaces of the two members, said parallel surfaces, in each member, being joined by a reversely curved surface of appreciable radius, spring means reacting between the two members to press the complemental inclined surfaces together, when at rest, to separate the reversely curved surfaces of the two members, and largely absorbing the shock of a blow communicated through a rivet to the rivet-engaging member, to effect rebound of such member against the rivet.

3. A riveting mouse comprising an elongated backing member and a similarly elongated rivet-engaging member each having several transverse, longitudinally spaced, parallel inclined surfaces for complemental interengagement between such surfaces of the two members, and each member being channeled, in the edge adjoining the other member, to define a through aperture, a rod disposed in said aperture and secured to one member, and having a head, a spring interposed between the other member and said head, to urge the complemental inclined surfaces together to spread the members apart when at rest.

4. A riveting mouse comprising an elongated backing member and a similarly elongated rivet-engaging member each having several transverse, longitudinally spaced, parallel inclined surfaces for complemental interengagement between such surfaces of the two members, a rod of a length to extend lengthwise through and extend beyond said members, the latter being channeled to straddle the rod, and the rod being secured to one member at one end and projecting beyond the other member at the other end, a head secured upon the projecting end of the rod, a spring surrounding the projecting end of the rod and engaging the head and that member to which the rod is not secured, to press the complemental inclined surfaces together, when the tool is at rest, in a direction to separate the two members.

5. The combination of claim 4, wherein the rod is threadedly secured to the backing member, whereby upon lengthwise adjustment of the rod relative to such backing member to spread the members apart, when at rest, a greater or lesser amount.

6. The combination of claim 4, wherein the rod is threadedly secured to the backing member, and is shouldered adjacent the opposite end of the rivet-engaging member, the latter having a fork straddling the rod and seating upon said shoulder to limit separation of the two members under the urging of the spring, and whereby upon adjustment of the rod lengthwise relative to the backing member the static separation of the two members may be varied.

7. The combination of claim 4, wherein the head is threadedly secured upon the projecting end of the rod, whereby upon adjustment of such head lengthwise of the rod to vary the static force of the spring.

8. A riveting mouse consisting of a rod, a backing member and a rivet-engaging member each channeled to straddle opposite sides of the rod, the rod being threadedly secured to the backing member, and formed with a shoulder adjacent an end of the rivet-engaging member, a complemental shoulder on the rivet-engaging member, a head threaded on the rod for adjustment therealong, a spring interposed between said head and the rivet-engaging member tending to hold the two shoulders in engagement, the two members having several transverse, longitudinally spaced, parallel inclined surfaces mutually engaged, under pressure of the spring, to move the two members apart, their separation being limited by the engagement of said shoulders, and being adjustable by rotation of the threaded rod relatively to the backing member.

ANDREW D. BAKER.